(12) United States Patent
Tsukamoto

(10) Patent No.: US 11,015,691 B2
(45) Date of Patent: *May 25, 2021

(54) TRANSAXLE

(71) Applicant: KANZAKI KOKYUKOKI MFG. CO., LTD., Hyogo (JP)

(72) Inventor: Michio Tsukamoto, Morristown, TN (US)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,722

(22) Filed: Jan. 29, 2020

(65) Prior Publication Data

US 2020/0166112 A1 May 28, 2020

Related U.S. Application Data

(63) Continuation-in-part of application No. 15/805,543, filed on Nov. 7, 2017, now Pat. No. 10,583,733.

(Continued)

(51) Int. Cl.
*B60K 17/346* (2006.01)
*F16H 48/40* (2012.01)
(Continued)

(52) U.S. Cl.
CPC .............. *F16H 48/40* (2013.01); *F16H 48/42* (2013.01); *F16H 57/037* (2013.01); *F16H 2057/02043* (2013.01); *F16H 2057/02086* (2013.01)

(58) Field of Classification Search
CPC .............. B60K 17/105; B60K 23/0808; B60K 17/344; B60K 23/04; B60K 17/3462;
(Continued)

(56) References Cited

U.S. PATENT DOCUMENTS

| 8,986,152 B2 | 3/2015 | Sato et al. |
| 9,453,564 B1 | 9/2016 | Pritchard et al. |

(Continued)

FOREIGN PATENT DOCUMENTS

JP 2015036288 A 2/2015

OTHER PUBLICATIONS

USPTO Non-Final Office Action corresponding to U.S. Appl. No. 15/805,543; dated Apr. 17, 2019.

*Primary Examiner* — Toan C To
(74) *Attorney, Agent, or Firm* — Cantor Colburn LLP

(57) ABSTRACT

A transaxle includes: an axle housing in which an input gear is rotatably supported; a differential casing that is contained in the axle housing while being rotatably supported relative to the axle housing; first and second side gears as a pair of spur gears that are contained in the differential casing, coaxially arranged, relatively rotatable with each other, and rotatable relative to the differential casing; a group of pinions as spur gears that are rotatably supported, in the differential casing, by rotational shafts that are in parallel with axes of the first and the second side gears in the differential casing, the group of pinions transmitting power between the first side gear and the second side gear; and a final gear having a ring shape that is contained in the axle housing, meshes with the input gear, incorporates the differential casing, and is relatively unrotatably coupled to the differential casing.

10 Claims, 11 Drawing Sheets

Related U.S. Application Data

(60) Provisional application No. 62/420,214, filed on Nov. 10, 2016.

(51) Int. Cl.
  *F16H 48/42* (2012.01)
  *F16H 57/037* (2012.01)
  *F16H 57/02* (2012.01)

(58) Field of Classification Search
  CPC ...... B60K 2023/046; B60K 2023/0858; F16H 3/32; F16H 48/05; F16H 48/08; F16H 2048/305; F16H 48/30
  USPC .................................. 180/352, 354, 355, 356
  See application file for complete search history.

(56) References Cited

U.S. PATENT DOCUMENTS

| | | | |
|---|---|---|---|
| 9,487,085 B2 * | 11/2016 | Matsuura | B60K 17/3462 |
| 10,630,137 B2 * | 4/2020 | Colavincenzo | B60K 6/442 |
| 2004/0200655 A1 | 10/2004 | Mueller | |
| 2005/0070390 A1 | 3/2005 | Irikura et al. | |
| 2007/0017729 A1 | 1/2007 | Nishimoto et al. | |
| 2008/0032843 A1 | 2/2008 | Ebihara et al. | |
| 2012/0234120 A1 | 9/2012 | Fukuda et al. | |
| 2013/0203543 A1 * | 8/2013 | Sten | F16H 48/36 475/150 |
| 2015/0306954 A1 | 10/2015 | Matsuura et al. | |
| 2016/0040724 A1 | 2/2016 | Ebihara et al. | |
| 2017/0284525 A1 | 10/2017 | Mizukawa | |

* cited by examiner

FIG.2
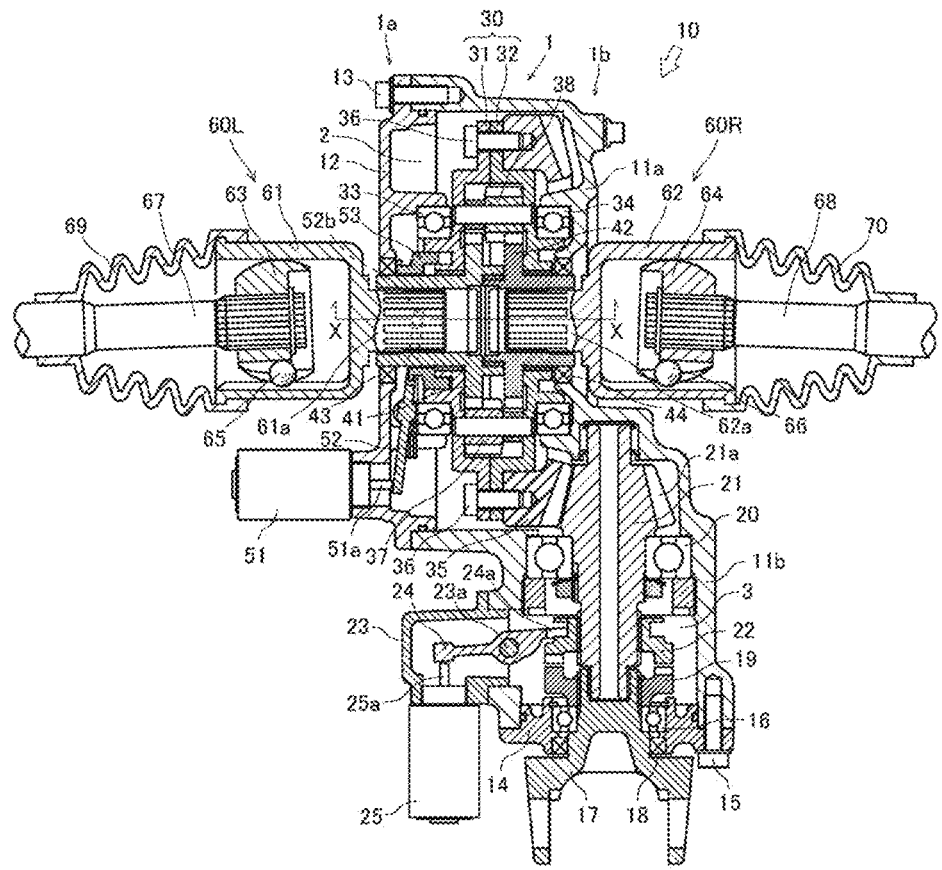
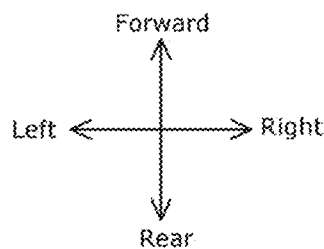

FIG.4
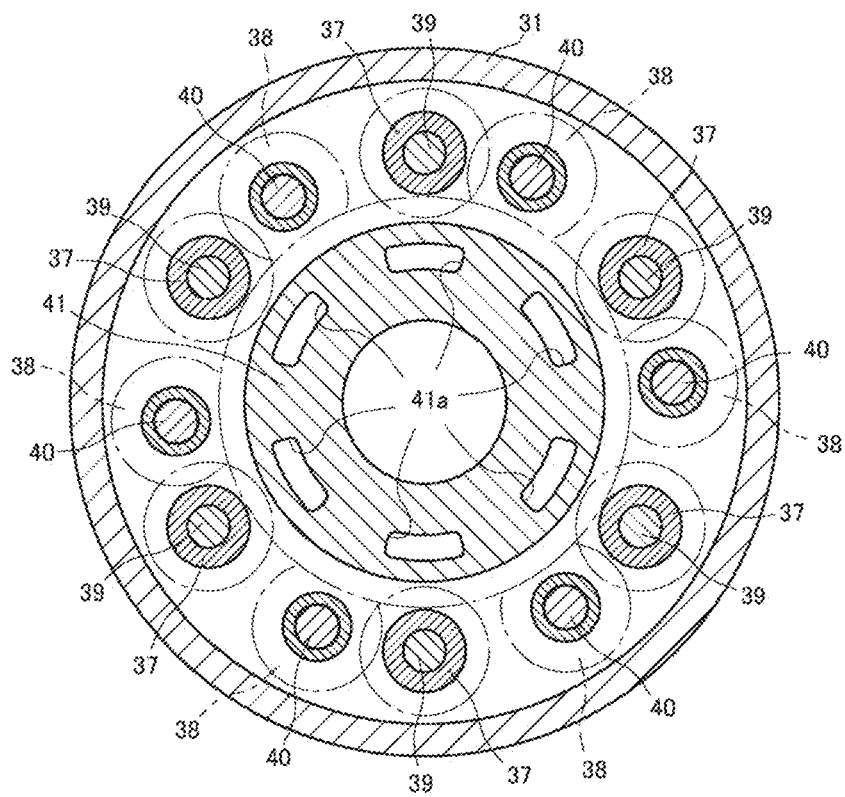
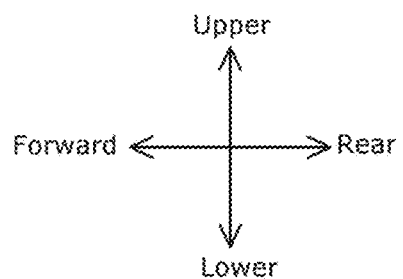

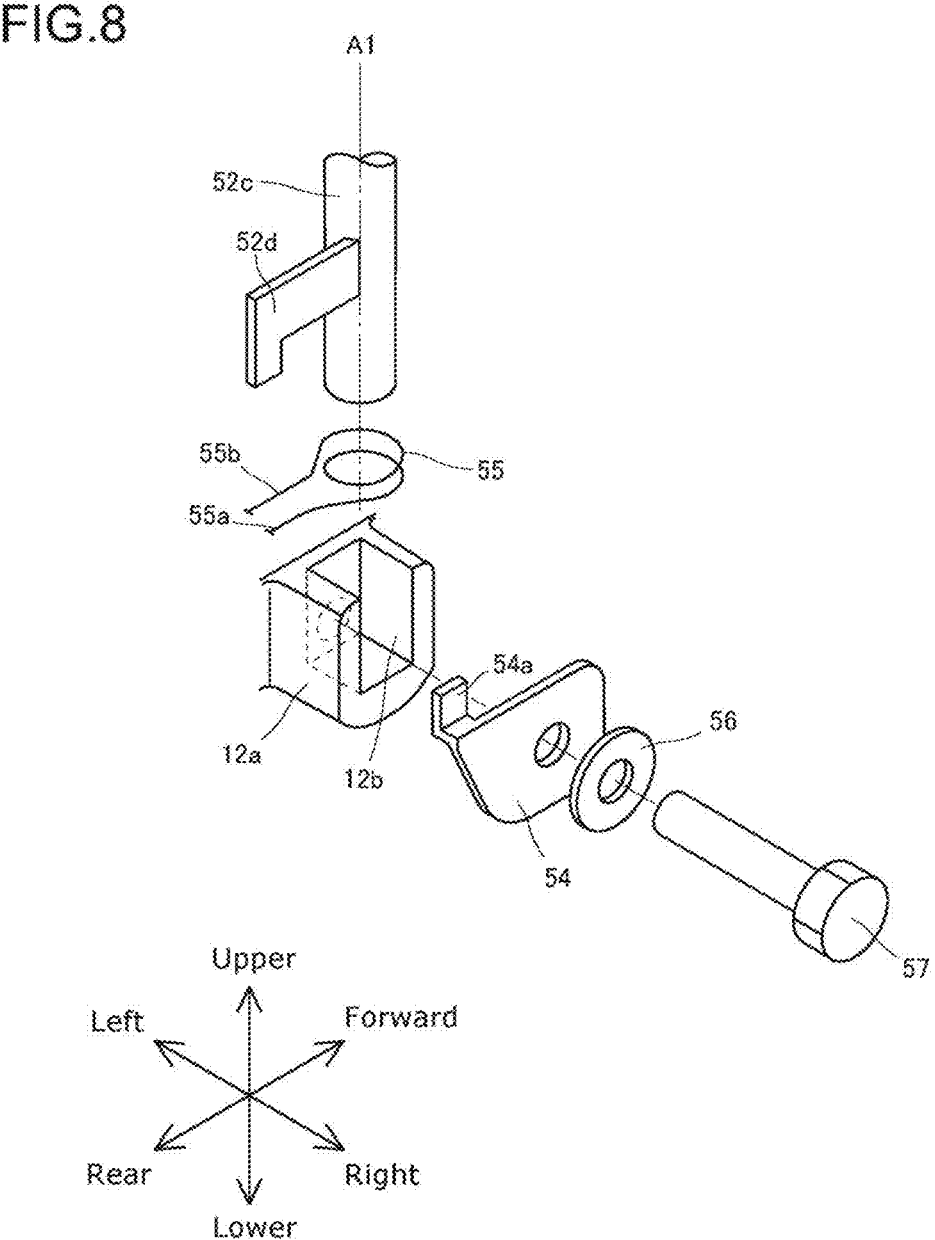

Lock state

Unlock state

TRANSAXLE

CROSS-REFERENCE TO RELATED APPLICATIONS

This application claims the benefit of priority under 35 U.S.C. § 119(e) based on U.S. Provisional Application Ser. No. 62/420,214 filed on Nov. 10, 2016, the entire content of which is also incorporated herein by reference. Further, this application is a continuation in part of U.S. patent application Ser. No. 15/805,543, filed on Nov. 7, 2017.

BACKGROUND OF THE INVENTION

Field of the Invention

At least one embodiment of the present invention relates to a transaxle.

U.S. Pat. No. 8,986,152 discloses a known four-wheel-drive all-terrain vehicle in which power is transmitted to rear wheels via a rear drive shaft and power is transmitted to front wheels via a front drive shaft. In this all-terrain vehicle disclosed in U.S. Pat. No. 8,986,152, the power is transmitted from the front and the rear drive shafts respectively to rear and front axles through front and rear transaxles.

A large suspension stroke is desirable in the all-terrain vehicle described above so that higher road ability can be achieved. A larger suspension stroke can be achieved with a transaxle having a smaller width in an axle direction assuming that a joint angle of the axle is the same. Thus, a transaxle with a small axle direction width has been called for.

SUMMARY OF THE INVENTION

At least one embodiment of the present application provides a transaxle that can have a small width in an axle direction.

A transaxle for achieving the object described above includes: an axle housing in which an input gear is rotatably supported; a differential casing that is contained in the axle housing while being rotatably supported relative to the axle housing; first and second side gears as a pair of spur gears that are contained in the differential casing, coaxially arranged, relatively rotatable with each other, and rotatable relative to the differential casing; a group of pinions as spur gears that are rotatably supported, in the differential casing, by rotational shafts that are in parallel with axes of the first and the second side gears in the differential casing, the group of pinions transmitting power between the first side gear and the second side gear; and a final gear having a ring shape that is contained in the axle housing, meshes with the input gear, incorporates the differential casing, and is relatively unrotatably coupled to the differential casing.

Preferably, first and second bearings that respectively support a first end side boss portion and a second end side boss portion of the differential casing are disposed in the axle housing, a first cylindrical portion extending in a direction opposite to the second side gear in an axial direction is formed on the first side gear, a second cylindrical portion extending in a direction opposite to the first side gear in the axial direction is formed on the second side gear, and the first cylindrical portion and the second cylindrical portion are relatively rotatably supported respectively on inner circumference sides of the first end side boss portion and the second end side boss portion.

Preferably, the axle housing has first and second end portions facing sides opposite to each other in the axial direction of the first and the second side gears, a first insertion hole in which the first cylindrical portion is inserted is formed in the first end portion, a second insertion hole in which the second cylindrical portion is inserted is formed in the second end portion, in the axle housing, a first oil seal is disposed between an inner circumference surface of the first insertion hole and an outer circumference surface of the first cylindrical portion, and a second oil seal is disposed between an inner circumference surface of the second insertion hole and an outer circumference surface of the second cylindrical portion, and at least one of the first and the second end portions of the axle housing is recessed inward in the axial direction of the first and the second side gears so that at least one of the first and the second oil seals is disposed on an inner side of the first and the second bearings in a radial direction.

Preferably, the axle housing incorporates a differential lock slider that is unrotatable relative to the differential casing and one of the first and the second side gears and is slidable in the axial direction, and the differential lock slider is disposed on an inner side of at least one of the first and the second bearings in the radial direction, and has a distal end that is able to protrude toward an inner side of the differential casing from the casing and one of the first and the second side gears to mesh with one of the first and the second side gears.

Preferably, a fork fits with the differential lock slider, and the fork has a portion disposed on an inner side of at least one of the first and the second bearings in the radial direction.

Preferably, the group of pinions include six sets of first and second pinions along an outer circumference end portion of the first and the second side gears, the first pinions meshing with a radial direction outer end portion of the first side gear, the second pinions meshing with a radial direction outer end portion of the second side gear and meshing with the first pinion.

A transaxle for achieving the object described above includes: an axle housing in which an input gear is rotatably supported; a differential casing that is contained in the axle housing while being rotatably supported relative to the axle housing; first and second side gears as a pair of spur gears that are contained in the differential casing, coaxially arranged, relatively rotatable with each other, and rotatable relative to the differential casing; a group of pinions as spur gears that are rotatably supported, in the differential casing, by rotational shafts that are in parallel with axes of the first and the second side gears in the differential casing, the group of pinions transmitting power between the first side gear and the second side gear; and a final gear with which at least two parts of the differential casing are joined to each other in such a manner as to be separable in an axial direction, the final gear being integrally provided to an outer circumference portion of one of the parts, the final gear meshing with the input gear.

Preferably, first and second bearings that respectively support a first end side boss portion and a second end side boss portion of the differential casing are disposed in the axle housing, a first cylindrical portion extending in a direction opposite to the second side gear in an axial direction is formed on the first side gear, a second cylindrical portion extending in a direction opposite to the first side gear in the axial direction is formed on the second side gear, and the first cylindrical portion and the second cylindrical portion are relatively rotatably supported respectively on inner circumference sides of the first end side boss portion and the second end side boss portion.

Preferably, the axle housing has first and second end portions facing sides opposite to each other in the axial direction of the first and the second side gears, a first insertion hole in which the first cylindrical portion is inserted is formed in the first end portion, a second insertion hole in which the second cylindrical portion is inserted is formed in the second end portion, in the axle housing, a first oil seal is disposed between an inner circumference surface of the first insertion hole and an outer circumference surface of the first cylindrical portion, and a second oil seal is disposed between an inner circumference surface of the second insertion hole and an outer circumference surface of the second cylindrical portion, and at least one of the first and the second end portions of the axle housing is recessed inward in the axial direction of the first and the second side gears so that at least one of the first and the second oil seals is disposed on an inner side of the first and the second bearings in a radial direction.

Preferably, the axle housing incorporates a differential lock slider that is unrotatable relative to the differential casing and one of the first and the second side gears and is slidable in the axial direction, and the differential lock slider is disposed on an inner side of at least one of the first and the second bearings in the radial direction, and has a distal end that is able to protrude toward an inner side of the differential casing from the casing and one of the first and the second side gears to mesh with one of the first and the second side gears.

Preferably, a fork fits with the differential lock slider, and the fork has a portion disposed on an inner side of at least one of the first and the second bearings in the radial direction.

Preferably, the group of pinions include six sets of first and second pinions along an outer circumference end portion of the first and the second side gears, the first pinions meshing with a radial direction outer end portion of the first side gear, the second pinions meshing with a radial direction outer end portion of the second side gear and meshing with the first pinion.

A transaxle for achieving the object described above includes: an axle housing in which an input gear is rotatably supported; a ring gear that is contained in the axle housing while being rotatably supported relative to the axle housing, and meshes with the input gear; first and second side gears as a pair of spur gears that are contained in the ring gear, coaxially arranged, relatively rotatable with each other, and rotatable relative to the differential casing; and a group of pinions as spur gears that are rotatably supported, in the ring gear, by rotational shafts that are in parallel with axes of the first and the second side gears in the ring gear, the group of pinions transmitting power between the first side gear and the second side gear.

Preferably, first and second bearings that respectively support a first end side boss portion and a second end side boss portion of the ring gear are disposed in the axle housing, a first cylindrical portion extending in a direction opposite to the second side gear in an axial direction is formed on the first side gear, a second cylindrical portion extending in a direction opposite to the first side gear in the axial direction is formed on the second side gear, and the first cylindrical portion and the second cylindrical portion are relatively rotatably supported respectively on inner circumference sides of the first end side boss portion and the second end side boss portion.

Preferably, the axle housing has first and second end portions facing sides opposite to each other in the axial direction of the first and the second side gears, a first insertion hole in which the first cylindrical portion is inserted is formed in the first end portion, a second insertion hole in which the second cylindrical portion is inserted is formed in the second end portion, in the axle housing, a first oil seal is disposed between an inner circumference surface of the first insertion hole and an outer circumference surface of the first cylindrical portion, and a second oil seal is disposed between an inner circumference surface of the second insertion hole and an outer circumference surface of the second cylindrical portion, and at least one of the first and the second end portions of the axle housing is recessed inward in the axial direction of the first and the second side gears so that at least one of the first and the second oil seals is disposed on an inner side of the first and the second bearings in a radial direction.

Preferably, the axle housing incorporates a differential lock slider that is unrotatable relative to the first and the second side gears and is slidable in the axial direction, and the differential lock slider is disposed on an inner side of at least one of the first and the second bearings in the radial direction, and has a distal end that is able to protrude through one of the first and the second side gears to mesh with another one of the first and the second side gears.

Preferably, a fork fits with the differential lock slider, and the fork has a portion disposed on an inner side of at least one of the first and the second bearings in the radial direction.

Preferably, the group of pinions include six sets of first and second pinions along an outer circumference end portion of the first and the second side gears, the first pinions meshing with a radial direction outer end portion of the first side gear, the second pinions meshing with a radial direction outer end portion of the second side gear and meshing with the first pinion.

As described above, the transaxle includes the first and the second side gears and the group of pinions through which the power is transmitted between the first and the second side gears as spur gears. Thus, compared with the configuration in which the power is transmitted between the first and the second side gears through bevel gears, the first and the second side gear in the transaxle can have a smaller width in the axial direction.

The transaxle thus having a smaller width in the axle direction is advantageous a larger suspension stroke can be achieved compared with a transaxle with a configuration in which power is transmitted between the first and the second side gears via bevel gears, assuming that a joint angle of the axle after the transaxle is mounted in an all-terrain vehicle or the like is the same.

The features and the effects described above as well as other features and effects are described with reference to the attached drawings in a detail description of the invention below.

BRIEF DESCRIPTION OF THE DRAWINGS

Some embodiments are described below with reference to the attached drawings. It should be noted that the embodiments and the drawings are merely examples, and should not be construed in a limiting sense. In some drawings, the same elements are denoted with the same reference numerals.

FIG. 2 is a cross-sectional plan view of the transaxle in a state where both axles are assembled.

FIG. 4 is a cross-sectional view taken along line Y-Y in FIG. 3.

FIG. 8 is a diagram illustrating assembled state of the differential lock mechanism.

DETAILED DESCRIPTION OF THE PREFERRED EMBODIMENTS

A transaxle 10 according to a first embodiment is described with reference to FIG. 1 to FIG. 9. For example, the transaxle 10 according to the present embodiment is applied to a front transaxle in a four-wheel-drive all-terrain vehicle. The transaxle 10 receives power from a drive shaft extending toward a forward side from a transmission disposed in a center portion in a front and rear direction, and transmits the power to a front wheel via an axle as an output shaft of the transaxle 10.

The transaxle 10 is hereinafter described as a front transaxle with an input portion disposed on a rear side and an output portion disposed on a forward side. For example, the transaxle 10 may alternatively be a rear transaxle of the all-terrain vehicle disposed with the input portion on the front side and the output portion on the rear side.

Figure 1:
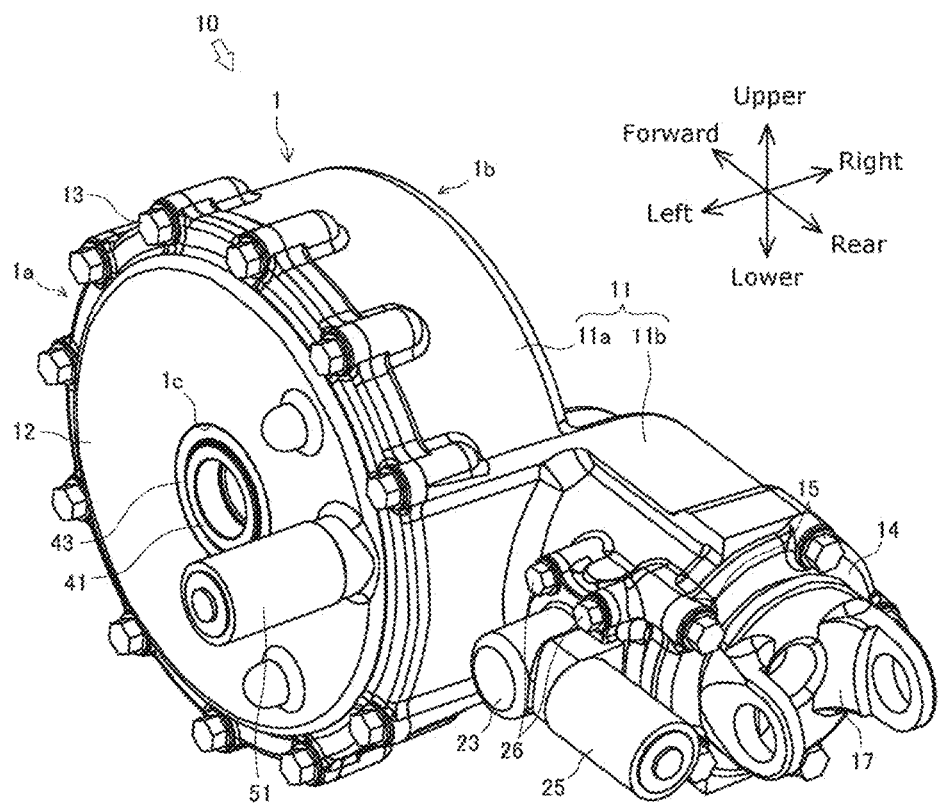
FIG. 1 is a perspective view of a transaxle according to a first embodiment.
Figure 3:
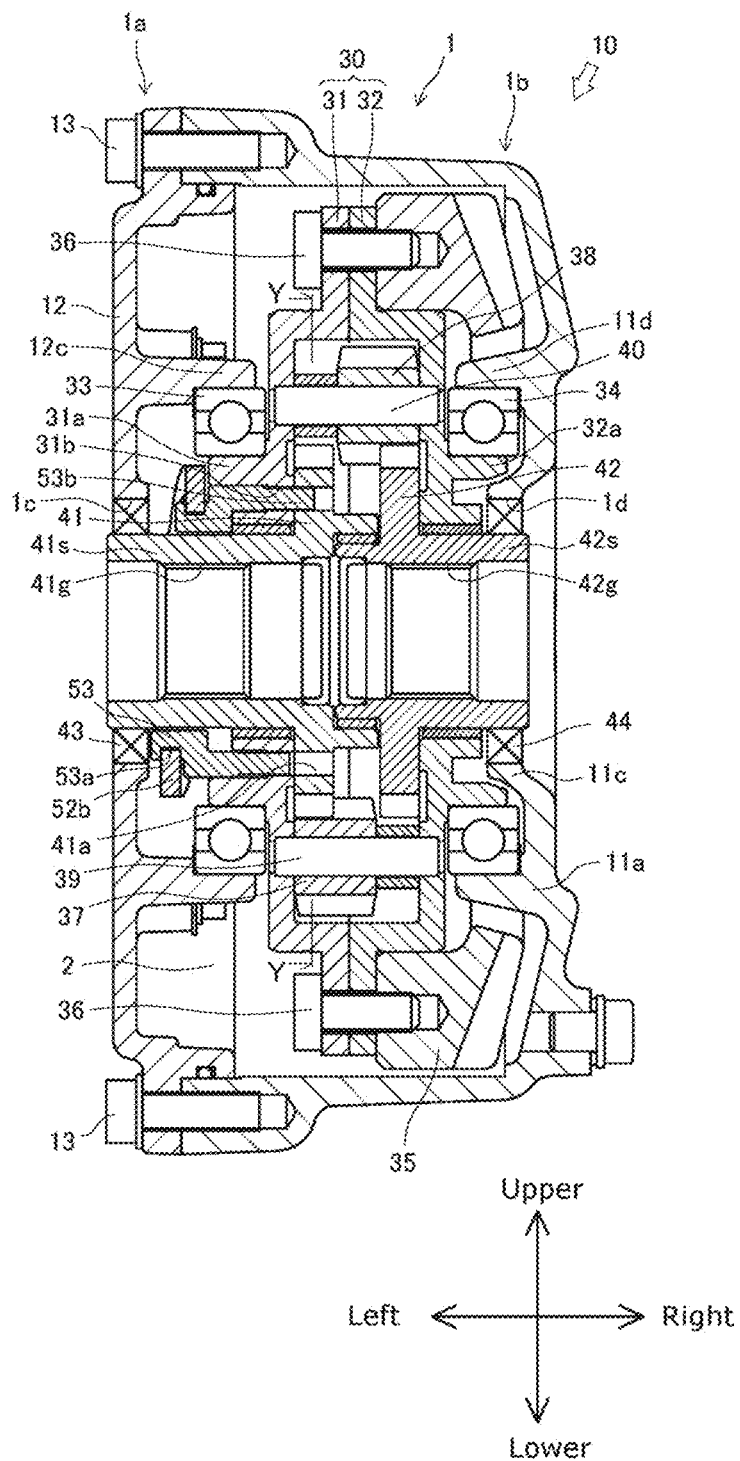
FIG. 3 is a cross-sectional view taken along line X-X in FIG. 2.

As illustrated in FIG. 1 to FIG. 3, the transaxle 10 mainly includes an axle housing 1, an input gear 21, a differential casing 30, a final gear 35, first and second side gears 41 and 42, and first and second pinions 37 and 38. Arrows in the figures define directions of the transaxle 10 in this specification. These components are described one by one below.

The axle housing 1 includes a housing main body member 11, a side lid member 12, and a rear lid member 14. The housing main body member 11 has a front side formed as a cylindrical differential gear containing portion 11a, having an opening on a left side, and a rear side formed as a cylindrical clutch containing portion 11b, having an opening on a rear side.

The side lid member 12 closes the left side opening of the differential gear containing portion 11a of the housing main body member 11, and is fixed to the housing main body member 11 with bolts 13. A differential gear chamber 2 of the axle housing 1 is formed in the differential gear containing portion 11a of the housing main body member 11 and the side lid member 12 thus joined to each other.

The rear lid member 14 closes the rear opening at a rear end of the clutch containing portion 11b of the housing main body member 11, and is fixed to the housing main body member 11 with bolts 15. A clutch chamber 3 of the axle housing 1 is formed in the clutch containing portion 11b of the housing main body member 11 and the rear lid member 14 thus joined to each other.

An input member 17 having an axial direction extending in a front and rear direction is rotatably supported by the rear lid member 14 via a bearing 16. The input member 17 is a universal joint that is coupled to a universal joint formed at a forward end of an unillustrated drive shaft, so that rotation of the drive shaft can be transmitted to the input member 17. A sealing member 18 is disposed between an inner circumference surface of the rear lid member 14 and an outer circumference surface of the input member 17.

The input gear 21 is contained in the clutch chamber 3 of the axle housing 1, while being coaxial with the input member 17. The input gear 21 is rotatably supported by the housing main body member 11 via a bearing 20. Bevel gear teeth 21a are formed at a forward end of the input gear 21. The input member 17 and the input gear 21 may be coupled to each other, so that rotation of the input member 17 can be transmitted to the input gear 21.

The input member 17 and the input gear 21 can be connected and disconnected to and from each other via a clutch mechanism. The clutch mechanism includes: a first clutch gear 19 that is relatively unrotatably assembled to the input member 17; a second clutch gear 22 that is relatively unrotatably assembled to the input gear 21 while being slidable in the axial direction and can mesh with the first clutch gear 19; and a pivotal member 24 and a solenoid actuator 25 that make the second clutch gear 22 slide.

The solenoid actuator 25 is assembled to a stay 23 fixed to the housing main body member 11 with bolts 26. A push pin 25a is formed on a distal end side of the solenoid actuator 25 and can be extended and retracted from and toward the solenoid actuator 25. A pivot shaft 23a is formed on the stay 23. The pivotal member 24 can pivot by being pivotally supported by the pivot shaft 23a.

The pivotal member 24 has one end portion coupled to the push pin 25a, and the other end portion at which an engagement portion 24a having a folk shape is formed. The engagement portion 24a of the pivotal member 24 engages with an engagement groove formed on an outer circumference surface of the second clutch gear 22.

In the clutch mechanism having a configuration described above, movement of the push pin 25a to extend from the distal end side of the solenoid actuator 25 causes the pivotal member 24 to pivot in such a manner that the second clutch gear 22 slides toward the first clutch gear 19 (rear side) due to the engagement portion 24a. Thus, the second clutch gear 22 meshes with the first clutch gear 19, whereby the input member 17 and the input gear 21 are connected to each other.

On the other hand, a retracting movement of the push pin 25a toward a base end side of the solenoid actuator 25 causes the pivotal member 24 to pivot in such a manner that the second clutch gear 22 slides away from the first clutch gear 19 (forward side) due to the engagement portion 24a. Thus, the second clutch gear 22 and the first clutch gear 19 are separated from each other. As a result, no power is transmitted from the input member 17 to the input gear 21.

In the differential gear chamber 2 of the axle housing 1, the differential casing 30 having an axial direction extending in a left and right direction is rotatably supported by the axle housing 1 via a first bearing 33 and a second bearing 34 disposed in the differential gear chamber 2. An outer circumference surface of the first bearing 33 fits with an inner circumference surface of a cylindrical bearing stay portion 12c formed on the side lid member 12 as a left side end portion of the differential gear chamber 2. An outer circumference surface of the second bearing 34 fits with an inner circumference surface of a bearing stay portion 11d formed on the differential gear containing portion 11a of the housing main body member 11 forming a center portion in the left and right direction and a right side end portion of the differential gear chamber 2.

The differential casing 30 includes: a cylindrical left differential casing 31 having an opening on a right side; and a cylindrical right differential casing 32, having an opening on a left side that are integrally combined while having the opening sides in contact with each other.

A first end side boss portion 31a protruding toward the left side, that is, toward a first end portion 1a of the axle housing 1 as described below, is formed in a left side portion of the left differential casing 31. An inner circumference surface of the first bearing 33 fits with an outer circumference surface of the first end side boss portion 31a. A second end side boss portion 32a protruding toward the right side, that is, toward a second end portion 1b of the axle housing 1 as described below, is formed in a right side portion of the right differential casing 32. An inner circumference surface of the second bearing 34 fits with an outer circumference surface of the second end side boss portion 32a. The differential casing 30 is rotatably supported by the axle housing 1 via the left and right bearings 33 and 34.

An insertion hole 31b is formed through the left differential casing 31, in a portion on an inner side of the first end side boss portion 31a in a radial direction in the left differential casing 31. A lock pin 53b of a differential lock slider 53 described below is inserted in the insertion hole 31b.

The final gear 35, which is a ring-shaped bevel gear, is relatively unrotatably coupled to the differential casing 30. Specifically, bolts 36, inserted through the left differential casing 31 and the right differential casing 32, are screwed to the final gear 35, in a state where the right side portion of the right differential casing 32 is inserted in the final gear 35. Thus, the left differential casing 31, the right differential casing 32, and the final gear 35 are integrally coupled to each other. One side of a rear portion of the differential gear chamber 2 in the left and right direction is connected to a front portion of the clutch chamber 3. The final gear 35 in the differential gear chamber 2 meshes with the bevel gear teeth 21a of the input gear 21 contained in the clutch chamber 3. Thus, rotation of the input gear 21 is transmitted to the differential casing 30 via the final gear 35.

The differential casing 30 contains the first side gear 41 and the second side gear 42 as a pair of spur gears. The first side gear 41 and the second side gear 42 are each contained while being coaxial with the differential casing 30. As illustrated in FIG. 4, six lock holes 41a are formed through the first side gear 41. The lock pin 53b of the differential lock slider 53 described below can extend into and retract from the lock hole 41a.

A first cylindrical portion 41s is formed on the first side gear 41, and extends in a direction opposite to the second side gear 42 in the left and right direction as the axial direction (left side). A second cylindrical portion 42s is formed on the second side gear 42, and extends in a direction opposite to the first side gear 41 in the left and right direction (right side). A cylindrical slide bearing is disposed between outer circumference surfaces of the first and the second cylindrical portions 41s and 42s and inner circumference surfaces of the first and the second end side boss portions 31a and 32a of the differential casing 30. As described above, the first cylindrical portion 41s is relatively rotatably supported on the inner circumference side of the first end side boss portion 31a via the slide bearing, and the second cylindrical portion 42s is relatively rotatably supported on the inner circumference side of the second end side boss portion 32a via the slide bearing. Thus, the first side gear 41 and the second side gear 42 can rotate relative to the differential casing 30 or with each other. Spline grooves 41g and 42g are respectively formed on inner circumference surfaces of the cylindrical portions 41s and 42s.

The axle housing 1 includes the first and the second end portions 1a and 1b facing opposite sides in the left and right direction as the axial direction of the first and the second side gears 41 and 42. Specifically, the first end portion 1a is on a side provided with the side lid member 12 defining one side end of the differential gear chamber 2. The second end portion 1b is a portion of the housing main body member 11, defining the other side end of the differential gear chamber 2, on the opposite side of the side lid member 12.

A first insertion hole 1c in which the first cylindrical portion 41s is inserted is formed on the side lid member 12 provided to the first end portion 1a of the axle housing 1. The side lid member 12 is provided with a first oil seal 43 disposed between an inner circumference surface of the first insertion hole 1c and the outer circumference surface of the first cylindrical portion 41s. A side wall portion of the differential gear containing portion 11a of the housing main body member 11, provided to the second end portion 1b of the axle housing 1, is provided with a second insertion hole 1d in which the second cylindrical portion 42s is inserted. The housing main body member 11 is provided with a second oil seal 44 disposed between an inner circumference surface of the second insertion hole 1d and the outer circumference surface of the second cylindrical portion 42s.

Figure 6:
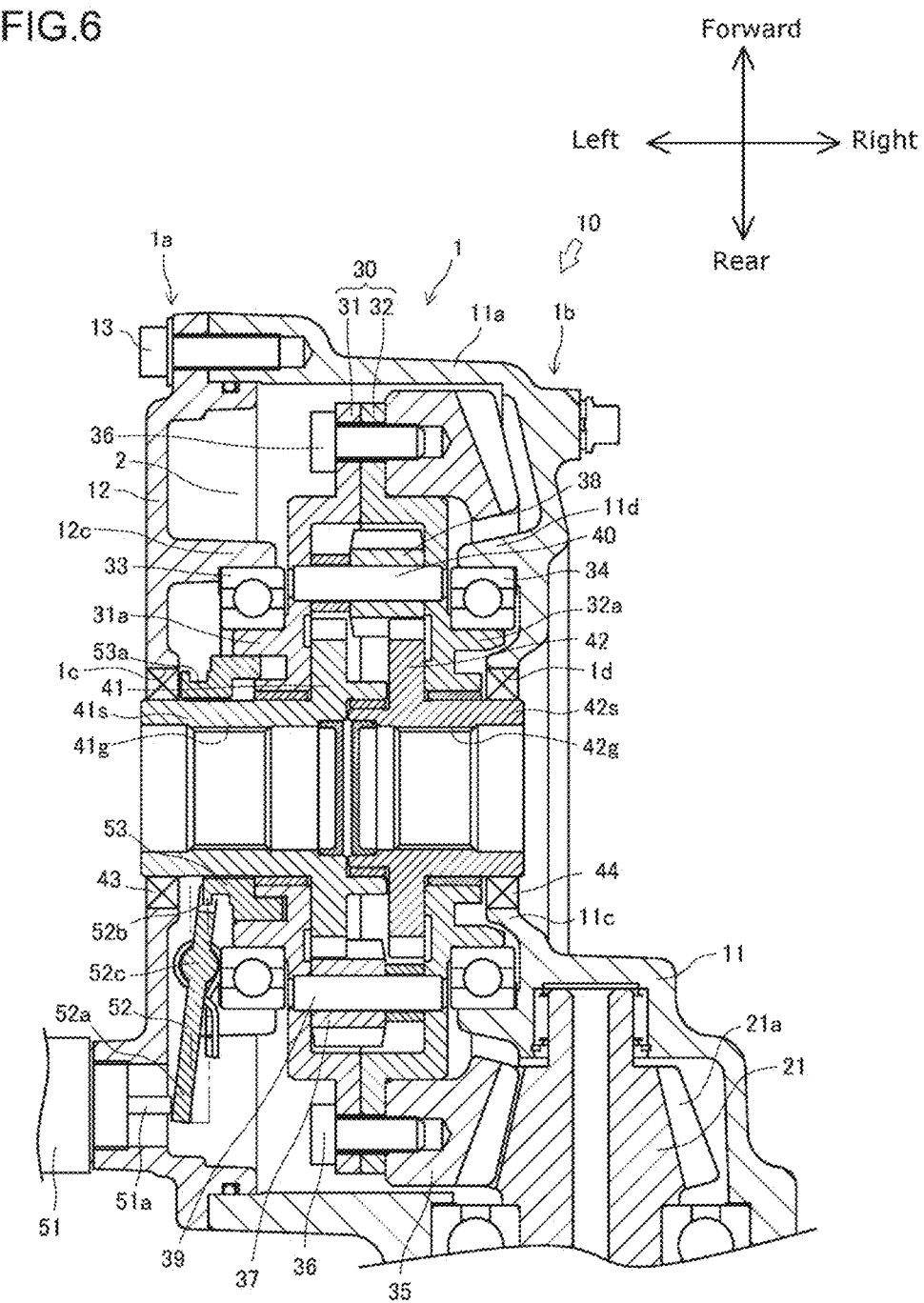
FIG. 6 is a cross-sectional plan view of the transaxle.

As illustrated in FIG. 3 and FIG. 6, the transaxle 10 according to the present embodiment has a configuration in which a circumference portion 11c of the second insertion hole 1d in the housing main body member 11 is recessed inward (leftward) in the left and right direction as the axial direction of the second side gear 42. Thus, the second oil seal 44 is disposed on the inner side of the second bearing 34 in the radial direction.

The differential casing 30 incorporates a group of pinions as spur gears through which power is transmitted between the first side gear 41 and the second side gear 42. The group of pinions are at least one (six in the present embodiment) set of the first pinion 37 and the second pinion 38 rotatably supported by the differential casing 30.

Specifically, as illustrated in FIG. 3 and FIG. 4, the first pinion 37 that meshes with an outer end portion of the first side gear 41 in the radial direction is disposed in such a manner as to be rotatable about a first rotation shaft 39. The second pinion 38 that meshes with an outer end portion of the second side gear 42 in the radial direction and also meshes with the first pinion 37 is disposed to be rotatable about a second rotation shaft 40. Thus, one set of the first pinion 37 and the second pinion 38 is formed. With the first side gear 41 and the second side gear 42 thus coupled to each other via the first pinion 37 and the second pinion 38, when one of the first side gear 41 and the second side gear 42 rotates relative to the differential casing 30, the other one rotates relative to the differential casing 30 in the opposite direction.

In the present embodiment as illustrated in FIG. 4, the six sets of the first and the second pinions 37 and 38 are arranged along an outer circumference end portions of the first and the second side gears 41 and 42. The transaxle 10 includes the six sets of the first and the second pinions 37 and 38 as the group of pinions. The first and the second rotation shafts 39 and 40 are disposed in parallel with the axes of the first and the second side gears 41 and 42.

As illustrated in FIG. 2, left and right axles 67 and 68 are coupled to the transaxle 10 via left and right output shafts 61 and 62 and constant velocity joints 60L and 60R. Spline shaft portions 61a and 62a are formed in inner end portions of the output shafts 61 and 62. When the output shafts 61 and 62 are inserted in the cylindrical portions 41s and 42s of the first and the second side gears 41 and 42, the spline shaft portions 61a and 62a mesh with the spline grooves 41g and 42g so that rotation of the first and the second side gears 41 and 42 can be transmitted to the output shafts 61 and 62.

The constant velocity joints 60L and 60R include: cylindrical portions formed in outer end portions of the output shafts 61 and 62; inner shaft portions 63 and 64 of the left and right axles 67 and 68, inserted in the cylindrical portions; and a plurality of balls 65 and 66 disposed in grooves between the cylindrical portions and the inner shaft portions 63 and 64. Covers 69 and 70 that are made of an elastic material and thus can expand and contract are provided between the cylindrical portion and the axles 67 and 68. In this configuration, the power can be transmitted between the output shafts 61 and 62 and the axles 67 and 68 with displacement due to pivoting tolerated.

Figure 5A:
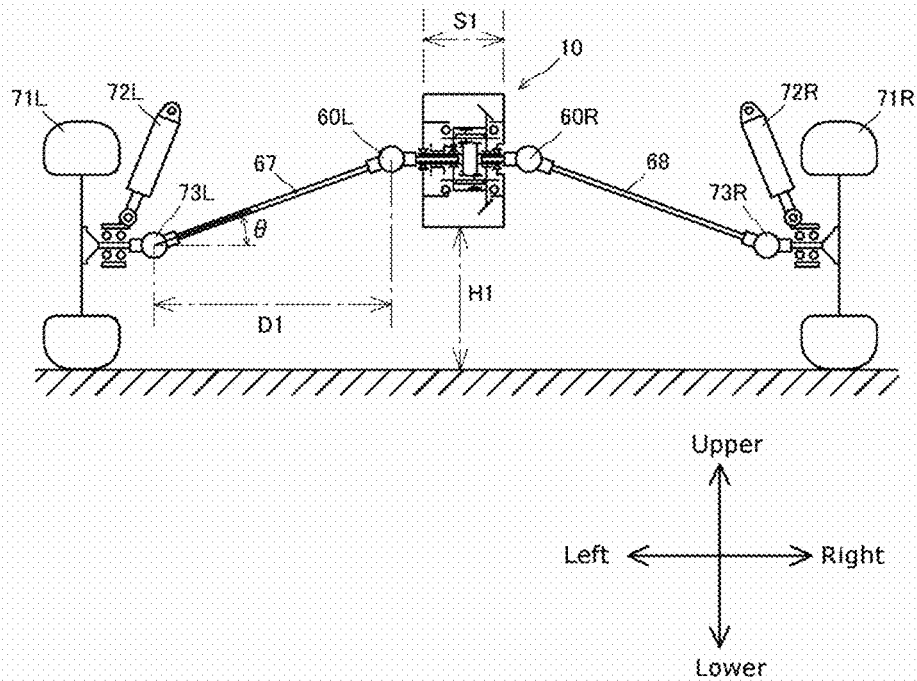
FIG. 5A is a back view illustrating a relationship between the transaxle according to the present embodiment and a suspension stroke.
Figure 5B:
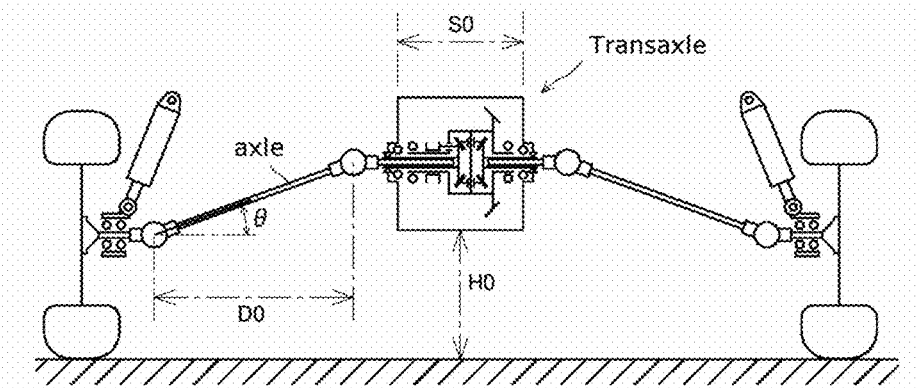
FIG. 5B is a back view illustrating a relationship between a transaxle according to a conventional technique and a suspension stroke.

As illustrated in FIG. 5A, the axles 67 and 68 are coupled to left and right axles, fixed to left and right front wheels 71L and 71R, via constant velocity joints 73L and 73R. Thus, the left and the right output shafts 61 and 62 are coupled to the axles of the left and the right front wheels 71L and 71R.

In the transaxle 10 having the configuration described above, torque transmitted from a power source is transmitted while being divided, while taking a difference in rotation speed between the front wheels 71L and 71R on inner and outer sides into consideration when the all-terrain vehicle makes a turn or in the other like situations. Specifically, when the all-terrain vehicle is traveling straight, the left and the right first and second side gears 41 and 42 receive an equal load. Thus, torque transmitted to the final gear 35 and the differential casing 30 is equally transmitted to the first and the second side gears 41 and 42 via the first pinion 37 and the second pinion 38 that are not rotating, whereby the left and the right axles 67 and 68 rotate at the same speed. When the all-terrain vehicle makes a turn, one of the left and the right first and second side gears 41 and 42 receives a larger load than the other one. Thus, the torque transmitted to the final gear 35 and the differential casing 30 is transmitted to the first and the second side gears 41 and 42 while being divided in such a manner that the left and the right axles 67 and 68 rotate at different speeds, with the first pinion 37 and the second pinion 38 rotating.

The transaxle 10 can switch between differential lock and differential unlock with a differential lock mechanism. The differential lock mechanism includes a solenoid actuator 51, a fork 52, and the differential lock slider 53. As illustrated in FIG. 1 and FIG. 2, the solenoid actuator 51 is assembled to the side lid member 12. A push pin 51a that can extend into and retract from the axle housing, from and to the solenoid actuator 51, extends from a distal end side of the solenoid actuator 51.

Figure 7:
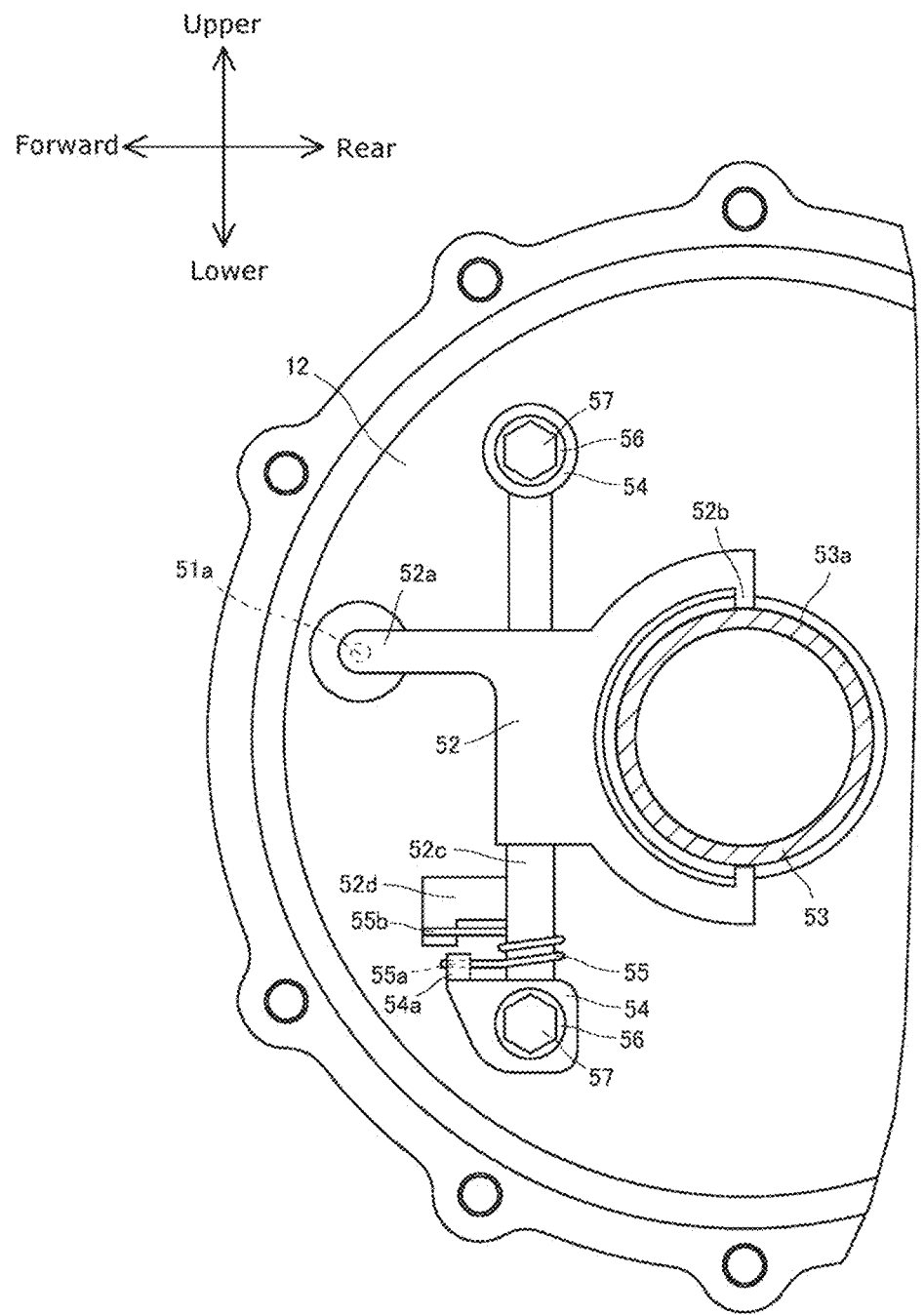
FIG. 7 is a diagram illustrating a differential lock mechanism.

As illustrated in FIG. 7, the fork 52 is pivotally attached in such a manner as to be pivotal about a pivot shaft 52c having an axial direction extending in an upper and lower direction, on an inner circumference side of the side lid member 12. A pushed portion 52a is formed in a rear end portion of the fork 52. The fork 52 pivots when the pushed portion 52a is pushed by the push pin 51a, as illustrated in FIG. 6. The fork 52 has a front portion having a semicircular plate shape. An engagement claw 52b that engages with the differential lock slider 53 is formed to extend from a distal end portion of the semicircular plate toward the center. An engagement protrusion plate 52d protruding rearward is formed in a lower portion of the pivot shaft 52c. As illustrated in FIG. 3, a distal end portion of the fork 52 is disposed on the inner side of the first bearing 33 in the radial direction.

The pivot shaft 52c of the fork 52 is supported by upper and lower fork supporting portions 12a formed at two positions on the inner circumference surface of the side lid member 12, as illustrated in FIG. 8. FIG. 8 illustrates the lower fork supporting portion 12a only. A groove portion 12b is formed in the fork supporting portion 12a. The fork 52 is pivotally supported by the fork supporting portion 12a with a fixed plate 54 covering the groove portion 12b fixed by using a washer 56 and a bolt 57, in a state where both end portions of the pivot shaft 52c are inserted in the groove portions 12b.

Figure 9A:
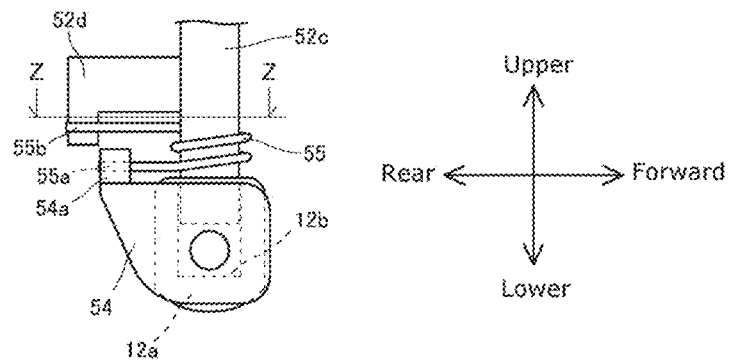
FIG. 9A is a diagram illustrating an assembled portion of the differential lock mechanism.

An engagement protrusion 54a is formed on the lower fixed plate 54. The pivot shaft 52c has a lower portion inserted in a torsion spring 55. As illustrated in FIG. 7 and FIG. 9A, the torsion spring 55 has one end portion 55a engaged with the engagement protrusion 54a of the fixed plate 54, and has the other end portion 55b engaged with the engagement protrusion plate 52d of the pivot shaft 52c. Thus, as illustrated in FIG. 9B, the fork 52 pivots in a direction indicated by an arrow R1 (a direction in which the engagement claw 52b is separated from the side lid member 12) upon receiving elastic force F1 from the torsion spring 55.

The differential lock slider 53 is an annular member that is disposed on an inner side of the first bearing 33 in the radial direction in the housing main body member 11 as illustrated in FIG. 3 and FIG. 6, while being unrotatable relative to the differential casing 30 and slidable in the axial direction. An engagement groove 53a is formed in the outer circumference surface of the differential lock slider 53. The engagement claw 52b of the fork 52 is inserted in the engagement groove 53a.

As illustrated in FIG. 3, the lock pin 53b is formed to protrude from a right distal end portion of the differential lock slider 53. The lock pin 53b is inserted in the insertion hole 31b of the left differential casing 31, and extends into and retracts from the lock hole 41a of the first side gear 41 in accordance with a sliding movement of the differential lock slider 53. Specifically, the lock pin 53b can protrude from the left differential casing 31 toward the inner side of the differential casing 30 to mesh with the first side gear 41. FIG. 3 and FIG. 6 illustrate a state where the lock pin 53b has entered in the lock hole 41a as a result of the movement of the differential lock slider 53 toward the differential casing 30 in a portion above the first cylindrical portion 41s, and illustrate a state where the lock pin 53b has retracted from the lock hole 41a as a result of the movement of the differential lock slider 53 toward the side lid member 12 in a portion below the first cylindrical portion 41s.

Figure 9B:
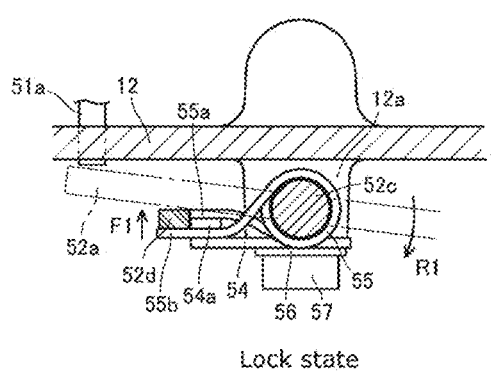
FIG. 9B is a cross-sectional view illustrating a lock state, taken along line Z-Z in FIG. 9A.

In the differential lock mechanism having a configuration described above, when the push pin 51a retracts toward a base end side of the solenoid actuator 51, the fork 52 pivots in the direction indicated by the arrow R1 due to the elastic force of the torsion spring 55 as illustrated in FIG. 9B. Thus, the engagement claw 52b and the differential lock slider 53 move toward the differential casing 30, whereby a lock state is achieved with the lock pin 53b inserted in the lock hole 41a.

Figure 9C:
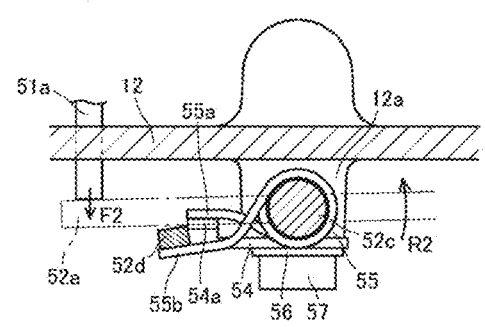
FIG. 9C is a cross-sectional view illustrating an unlock state, taken along line Z-Z in FIG. 9A.

When the push pin 51a extends from the distal end side of the solenoid actuator 51, the push pin 51a makes the fork 52 pivot in a direction indicated by an arrow R2 against the elastic force of the torsion spring 55, as illustrated in FIG. 9C. Thus, the engagement claw 52b moves in a direction to be separated from the differential casing 30 and the differential lock slider 53 moves toward the side lid member 12, whereby the lock pin 53b is retracted from the lock hole 41a and an unlock state is achieved.

As described above, the transaxle 10 according to the present embodiment includes the spur gears as the first and the second pinions 37 and 38 serving as the group of pinions through which the power is transmitted between the first and the second side gears 41 and 42 and the first and the second side gears 41 and 42. Thus, the first and the second side gears 41 and 42 in the transaxle 10 can have a width S1 (see FIG. 5A) in the axial direction (left and right direction) that is smaller than a width S0 (see FIG. 5B) of a conventional transaxle with which power is transmitted between first and second side gears through bevel gears.

The transaxle 10 according to the present embodiment can have the width S1 in the axle direction that is smaller than the width S0 of the conventional transaxle. Thus, the axles 67 and 68 can have a longer length if a joint angle θ (see FIG. 5A and FIG. 5B) of the axle installed in the all-terrain vehicle or the like is the same. Thus, a height H1 of the transaxle 10 from the ground can be higher than a height H0 in the conventional configuration, whereby a larger suspension stroke can be achieved with shock absorbers 72L and 72R.

In the transaxle 10 according to the present embodiment, the differential casing 30 and the final gear 35 are integrally coupled in a state where the right side portion of the differential casing 30 is inserted in the final gear 35. Thus, the transaxle 10 can have a smaller width S1 compared with a configuration where the final gear is disposed adjacent to the differential casing in the axial direction.

In the transaxle 10 according to the present embodiment, the first and the second cylindrical portions 41s and 42s of the first and the second side gears 41 and 42 are rotatably supported respectively by inner circumference sides of the first and the second end side boss portions 31a and 32a. Thus, the transaxle 10 can have a smaller width S1 compared with a configuration where the boss portions are supported at positions adjacent to the respective cylindrical portions in the axial direction.

In the transaxle 10 according to the present embodiment, the circumference portion 11c of the second insertion hole 1d in the housing main body member 11 of the axle housing 1 is recessed leftward, that is, inward in the axial direction. Thus, the second oil seal 44 provided to the circumference portion 11c is disposed on the inner side of the second bearing 34 in the radial direction. Thus, the position of the second oil seal 44 overlaps with the second bearing 34 in the axial direction, and thus, the transaxle 10 can have a smaller width S1 compared with a configuration in which the second oil seal 44 is disposed at a position outside the axial direction of the second bearing 34. A configuration may be employed in which the first oil seal 43 is disposed on the inner side of the first bearing 33 in the radial direction, with the circumference portion of the first insertion hole 1c in the side lid member 12 recessed rightward, that is, inward in the axial direction. Furthermore, a configuration may be employed in which both of the first and the second oil seals 43 and 44 are disposed on the inner sides of the first and the second bearings 33 and 34 in the radial direction.

In the transaxle 10 according to the present embodiment, the differential lock slider 53 is disposed, on the inner side of the first bearing 33 in the radial direction in the housing main body member 11, in such a manner as to be slidable in the axial direction relative to the differential casing 30. Thus, the position of the differential lock slider 53 overlaps with the first bearing 33 in the axial direction. Thus, the width S1 of the transaxle 10 can further be reduced. In the configuration in which the differential lock slider 53 is disposed on the side of the second side gear 42, the differential lock slider 53 may be disposed on the inner side of the second bearing 34 in the radial direction.

In the transaxle 10 according to the present embodiment, the fork 52 has a distal end portion moved toward the inner side in the axial direction and thus is disposed on the inner side of the first bearing 33 in the radial direction, as a result of moving the differential lock slider 53 to the differential lock position to mesh with the differential casing 30. Thus, a gap between the fork 52 and the differential casing 30 in the axial direction can be reduced, whereby the width S1 of the transaxle 10 can further be reduced. In the configuration in which the differential lock slider 53 is disposed on the side of the second side gear 42, the distal end portion of the fork 52 may be disposed on the inner side of the second bearing 34 in the radial direction.

In the transaxle 10 according to the present embodiment, the six sets of the first and the second pinions 37 and 38, as the group of pinions, are arranged along the outer circumference end portions of the first and the second side gears 41 and 42. Thus, force applied to the group of pinions can be dispersed, whereby the first and the second side gears 41 and 42, the first pinion 37, and the second pinion 38 can have a smaller thickness in the axial direction. Thus, the transaxle 10 can have a smaller width S1 and thus can have a compact configuration. Four, eight, or twelve sets of the first and the second pinions 37 and 38 can be arranged as the group of pinions, instead of arranging the six sets.

Now, a transaxle 110 according to a second embodiment is described with reference to FIG. 10. A configuration of the transaxle 110 according to the present embodiment that is the same as that of the transaxle 10 according to the embodiment described above is denoted with the same reference numeral, and will not be described in detail. Thus, only a different configuration will be described.

Figure 10:
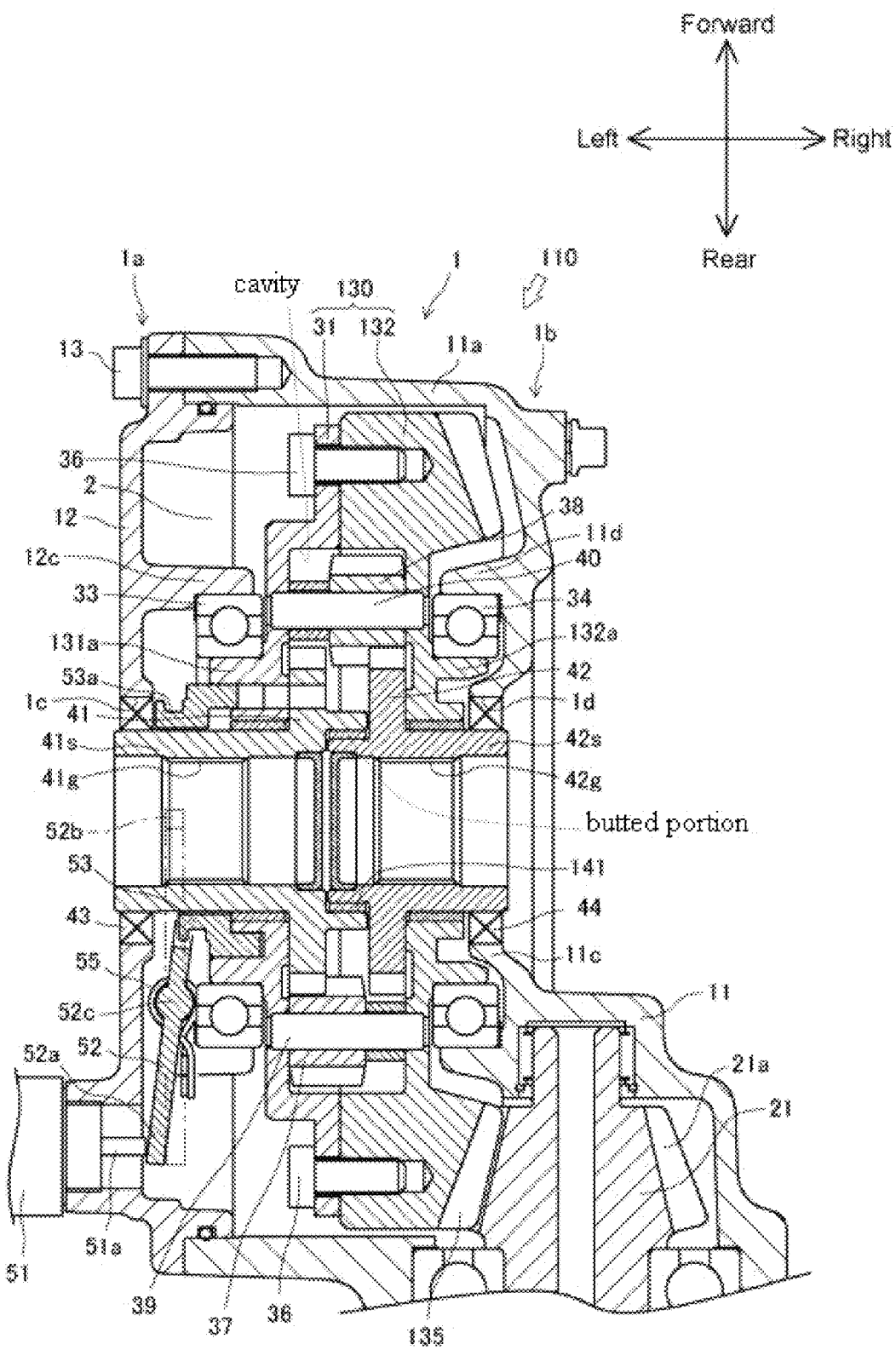
FIG. 10 is a cross-sectional plan view of a transaxle according to a second embodiment.

As illustrated in FIG. 10, the transaxle 110 is obtained by only changing the configuration of the differential casing and the final gear from that in the transaxle 10. Specifically, a differential casing 130 of the transaxle 110 includes: the cylindrical left differential casing 31 having an opening on a right side; and a cylindrical right differential casing 132, having an opening on a left side that are integrally combined while having the opening sides in contact with each other. In other words, the left differential casing 31 and the right differential casing 132 are joined in such a manner as to be separable in the axial direction.

The left differential casing 31 of the differential casing 130 is the same as the left differential casing 31 of the differential casing 30. How the first side gear 41 is arranged in the left differential casing 31, and the configuration of the differential lock mechanism including the differential lock slider 53 fit to the first side gear 41 in such a manner as to be able to engage with the left differential casing 31 and the like are the same as those in the transaxle 10. In the transaxle 110, the first cylindrical portion 41s on an inner end side of a gear portion of the first side gear 41 and the second cylindrical portion 42s on an inner end side of a gear portion of the second side gear 42 are nested, and are mutually supported via a bushing 141. The first cylindrical portion 41s is supported by the bearing 33 via a bushing 141 and the differential case 31 at a portion on the outer end side of the gear portion of the first cylindrical portion 41s. The second cylindrical portion 42s is supported by the bearing 34 via a bushing 141 and the right differential casing 132 at a portion on the outer end side of the gear portion of the second cylindrical portion 42s. An insertion hole is formed through the first side gear 41 and the differential case 31. The insertion hole is configured to be able to pass through the lock pin of the differential lock slider 53a. In FIG. 10, the differential lock mechanism is shown as an unlocked state.

A second end side boss portion 132a is formed on the right differential casing 132 and is supported by the second bearing 34. A final gear 135 as bevel gear teeth is integrally formed with a right side portion of the right differential casing 132. The final gear 135 meshes with the bevel gear teeth 21a of the input gear 21. With the final gear 135 thus integrally formed with the right differential casing 132, the differential casing 130 can have a configuration in which the final gear 135 is integrally provided.

How the second side gear 42 is arranged in the right differential casing 132 is the same as that in the transaxle 10. The configuration of the group of pinions as the sets of the first and the second pinions 37 and 38 in the differential casing 130 including a left differential casing 131 and the right differential casing 132 that are coupled to each other is the same as that in the differential casing 130 of the transaxle 10.

As described above, the transaxle 110 has the configuration that is the same as that of the transaxle 10 except that the final gear 135 is integrally formed on the differential casing 130, and can achieve the same advantageous effects as the transaxle 10 described above. Furthermore, with the final gear 135 integrally formed on the right differential casing 132 of the differential casing 130, the number of components of the differential casing and the final gear can be reduced, whereby cost reduction and higher assemblability can be achieved.

Now, a transaxle 210 according to a third embodiment is described with reference to FIG. 11. A configuration of the transaxle 210 according to the present embodiment that is the same as that of the transaxle 10 and the transaxle 110 according to the embodiments described above is denoted with the same reference numeral, and will not be described in detail. Thus, only a different configuration will be described.

Figure 11:
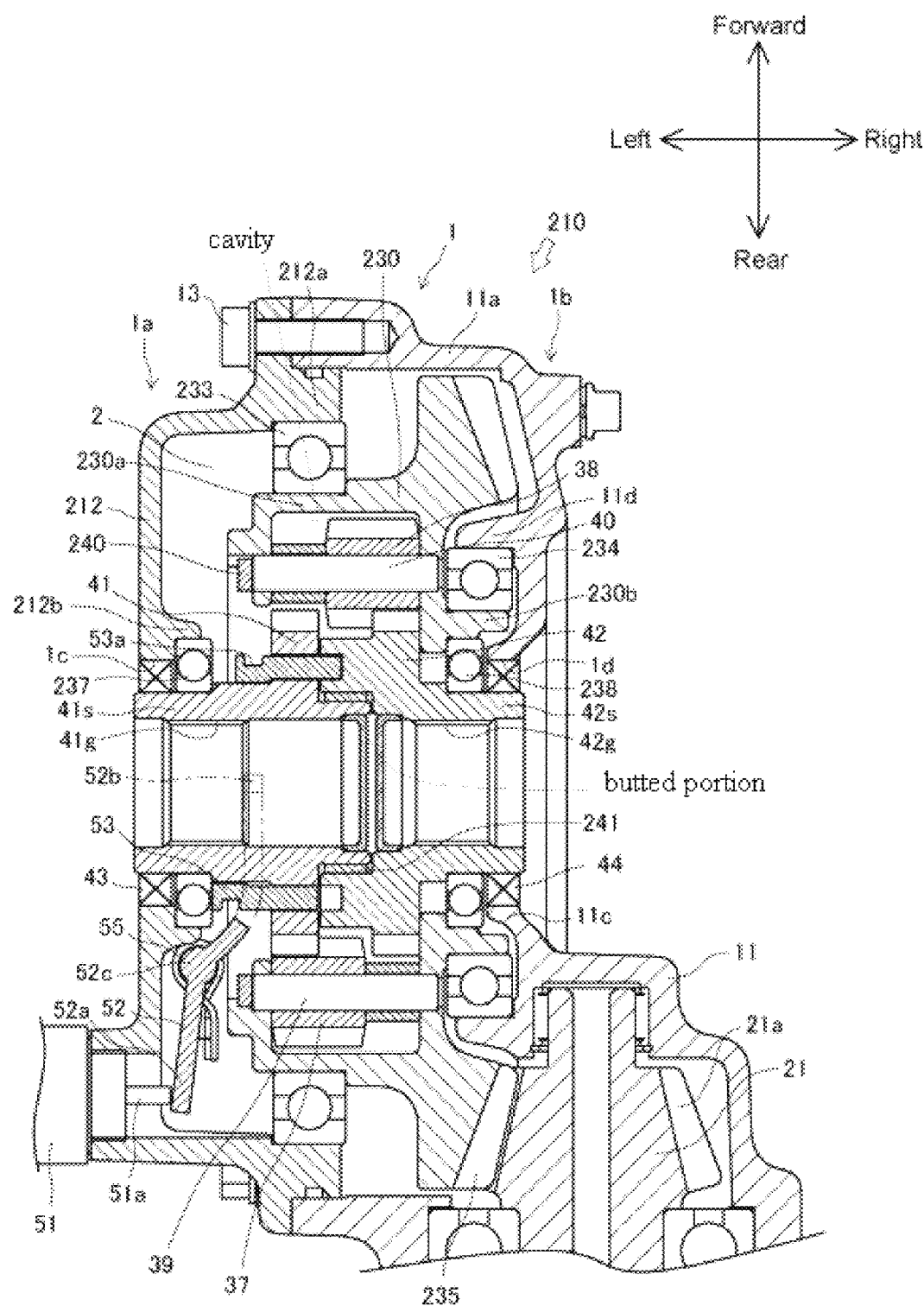
FIG. 11 is a cross-sectional plan view of a transaxle according to a third embodiment.

As illustrated in FIG. 11, the transaxle 210 mainly includes the axle housing 1, the input gear 21, a ring gear 230, the first and the second side gears 41 and 42, the first and the second pinions 37 and 38, and the like. These components are described one by one below.

In the present embodiment, the ring gear 230 having the axial direction extending in the left and right direction is disposed in the differential gear containing portion 11a of the housing main body member 11 while being rotatably supported by a first bearing 233 provided to the side lid member 212 and a second bearing 234 provided to the housing main body member 11. An outer circumference surface of the first bearing 233 fits with an inner circumference surface of a bearing stay portion 212a formed on an inner circumference surface of the opening of the side lid member 212 of the differential gear chamber 2. An outer circumference surface of the second bearing 234 fits with the inner circumference surface of the bearing stay portion 11d formed on the differential gear containing portion 11a of the housing main body member 11 forming the center portion in the left and right direction and the right side end portion of the differential gear chamber 2.

As illustrated in FIG. 11, the transaxle 210 is obtained by changing the configuration of the differential casing and the final gear from that in the transaxle 10. Specifically, the ring gear 230 of the transaxle 210 is obtained by integrating the differential casing 30 and the final gear 35 in the transaxle 10.

A first end side boss portion 230a is formed in an intermediate portion of an outer circumference surface of the ring gear 230. An inner circumference surface of the first bearing 233 fits with an outer circumference surface of the first end side boss portion 230a. A second end side boss portion 230b protruding rightward is formed on the right side of the ring gear 230. An inner circumference surface of the second bearing 234 fits with an outer circumference surface of the second end side boss portion 230b.

A gear portion 235 is formed on the right side of the ring gear 230, and meshes with the bevel gear teeth 21a of the input gear 21. Thus, rotation of the input gear 21 is transmitted to the ring gear 230.

The ring gear 230 contains the first side gear 41 and the second side gear 42 as a pair of spur gears. The first side gear 41 and the second side gear 42 are each coaxially disposed with the ring gear 230. The first side gear 41 is rotatably supported via a third bearing 237 provided to the side lid member 212. In the transaxle 210, the first cylindrical portion 41s on an inner end side of the gear portion of the first side gear 41 and the second cylindrical portion 42s on an inner end side of the gear portion of the second side gear 42 are nested, and are mutually supported via a bushing 241. The first cylindrical portion 41s is directly supported by the bearing 237 at a portion on the outer end side of the gear portion of the first cylindrical portion 41s. The second cylindrical portion 42s is supported by the bearing 234 via the bearing 238 and the ring gear 230 at a portion on the outer end side of the gear portion of the second cylindrical portion 42s.

An outer circumference surface of the third bearing 237 fits with an inner circumference surface of a bearing stay portion 212b formed on the inner side of a periphery of the first insertion hole 1c in the side lid member 212. The second side gear 42 is rotatably supported via a fourth bearing 238 provided to the ring gear 230. An outer circumference surface of the fourth bearing 238 fits with an inner circumference surface of the second end side boss portion 230b formed on the right end portion of the ring gear 230.

An insertion hole is formed through the first side gear 41. The lock pin of the differential lock slider 53 is inserted in the insertion hole. A lock hole is formed through the second side gear 42. The lock pin of the differential lock slider 53 can be extended and retracted into and from the lock hole. The lock pin of the differential lock slider 53 is always engaged with the first cylindrical portion 41s of the first side gear 41, and engages with the second cylindrical portion 42s of the second side gear 42 in a locked state of the differential lock mechanism. In FIG. 11, the differential lock mechanism is shown as the locked state.

The ring gear 230 incorporates a group of pinions as spur gears through which power is transmitted between the first side gear 41 and the second side gear 42. The group of pinions are at least one (six in the present embodiment) set of the first pinion 37 and the second pinion 38 rotatably supported by the differential casing 30.

Specifically, the first pinion 37 that meshes with the outer end portion of the first side gear 41 in the radial direction is disposed in such a manner as to be rotatable about the first rotation shaft 39. The second pinion 38 that meshes with the outer end portion of the second side gear 42 in the radial direction and also meshes with the first pinion 37 is disposed to be rotatable about the second rotation shaft 40. Thus, one set of the first pinion 37 and the second pinion 38 is formed. With the first side gear 41 and the second side gear 42 thus coupled to each other via the first pinion 37 and the second pinion 38, when one of the first side gear 41 and the second side gear 42 rotates relative to the ring gear 230, the other one rotates relative to the ring gear 230 in the opposite direction. The first and second rotation shafts 39 and 40 are disposed in parallel with the axes of the first and the second side gears 41 and 42. In the transaxle 210, a retaining ring 240 for preventing the first and second rotation shafts 39 and 40 are coming out from the ring gear 230 is arranged.

In the transaxle 210 having the configuration described above, torque transmitted from a power source is transmitted while being divided, while taking a difference in rotation speed between the front wheels on inner and outer sides into consideration when the all-terrain vehicle makes a turn or in the other like situations. Specifically, when the all-terrain vehicle is traveling straight, the left and the right first and second side gears 41 and 42 receive an equal load. Thus, torque transmitted to the ring gear 230 is equally transmitted to the first and the second side gears 41 and 42 via the first pinion 37 and the second pinion 38 that are not rotating, whereby the left and the right axles rotate at the same speed. When the all-terrain vehicle makes a turn, one of the left and the right first and second side gears 41 and 42 receives a larger load than the other one. Thus, the torque transmitted to the ring gear 230 is transmitted to the first and the second side gears 41 and 42 while being divided in such a manner that the left and the right axles rotate at different speeds, with the first pinion 37 and the second pinion 38 rotating.

The transaxle 210 can switch between differential lock and differential unlock with a differential lock mechanism. The differential lock mechanism includes the solenoid actuator 51, the fork 52, and the differential lock slider 53. As illustrated in FIG. 11, the solenoid actuator 51 is assembled to the side lid member 212. The push pin 51a that can extend into and retract from the axle housing, from and to the solenoid actuator 51, extends from the distal end side of the solenoid actuator 51.

As illustrated in FIG. 11, the fork 52 is pivotally attached in such a manner as to be pivotal about a pivot shaft 52c having an axial direction extending in an upper and lower direction, on an inner circumference side of the side lid member 212. A pushed portion 52a is formed in a rear end portion of the fork 52. The fork 52 pivots when the pushed portion 52a is pushed by the push pin 51a. The fork 52 has a front portion having a curved semicircular plate shape. An engagement claw 52b that engages with the differential lock slider 53 is formed to extend from a distal end portion of the semicircular plate toward the center. As illustrated in FIG. 11, a distal end portion of the fork 52 is disposed on the inner side of the first bearing 233 in the radial direction.

The differential lock slider 53 is an annular member that is disposed on an inner side of the first bearing 233 in the radial direction in the housing main body member 11 as illustrated in FIG. 11, while being unrotatable relative to the first side gear 41 and slidable in the axial direction. The engagement groove 53a is formed in the outer circumference surface of the differential lock slider 53. The engagement claw 52b of the fork 52 is inserted in the engagement groove 53a.

A lock pin is formed to protrude from a right distal end portion of the differential lock slider 53. The lock pin is inserted in an insertion hole of the first side gear 41, and extends into and retracts from a lock hole of the second side gear 42 in accordance with a sliding movement of the differential lock slider 53. Specifically, the lock pin can protrude from the first side gear 41 toward the inner side of the ring gear 230 to mesh with the second side gear 42. FIG. 11 illustrates a state where the lock pin has entered in the lock hole as a result of the movement of the differential lock slider 53 toward the inner side of the ring gear 230 in a portion above the first cylindrical portion 41s, and illustrates a state where the lock pin has retracted from the lock hole as a result of the movement of the differential lock slider 53 toward the side lid member 212 in a portion below the first cylindrical portion 41s.

In the differential lock mechanism having a configuration described above, when the push pin 51a retracts toward a base end side of the solenoid actuator 51, the fork 52 pivots clockwise in plan view due to the elastic force of the torsion spring 55. Thus, the engagement claw 52b and the differential lock slider 53 move toward the inner side of the ring gear 230, whereby the lock state is achieved with the lock pin inserted in the lock hole.

When the push pin 51a extends from the distal end side of the solenoid actuator 51, the push pin 51a makes the fork 52 pivot counterclockwise in plan view against the elastic force of the torsion spring 55. Thus, the engagement claw 52b moves in a direction to be separated from the ring gear 230 and the differential lock slider 53 moves toward the side lid member 212, whereby the lock pin is retracted from the lock hole and the unlock state is achieved.

As described above, the transaxle 210 has the configuration that is substantially the same as that of the transaxle 10 except that the ring gear 230 in an integrated form is used instead of the differential casing 30 and the final gear 35, and can achieve the same advantageous effects as the transaxle 10 described above. Furthermore, with the differential casing 130 and the final gear 135 integrally formed as the ring gear 230, the number of components of the ring gear 230 can be reduced, whereby cost reduction and higher assemblability can be achieved.

The above description relates to some specific embodiments of the present invention. Various modifications can be made without departing from the spirit of the present invention. The appended claims are intended to cover such various modifications within the true scope and the spirit of the present invention.

Thus, all the embodiments disclosed in the present application should be regarded as example, and should not be construed in a limiting sense. The scope of the present invention better defined with the scope of claims described below, than in the specification. The present invention includes any modifications within the scope of claims and its equivalents.

What is claimed is:

1. A transaxle comprising: an axle housing in which an input gear is rotatably supported;
   a final gear that is contained in the axle housing while being rotatably supported relative to the axle housing, and having a cavity at an axis of the final gear;
   first and second side gears as a pair of spur gears that are contained in the cavity of the final gear, coaxially arranged, butted portions of the first and second side gears are relatively rotatable with each other, and rotatable relative to the cavity;

a group of pinions as spur gears that are rotatably supported in the cavity of the final gear by rotational shafts that are in parallel with axes of the first and the second side gears in the cavity, the group of pinions transmitting power between the first side gear and the second side gear, wherein the final gear is configured by at least a first part and a second part, and wherein the at least first part and second part of final gear are joined to each other in such a manner as to be separable to a part of first end side and a part of second end side in an axial direction of the final gear.

2. The transaxle according to claim 1, wherein the final gear has a recess on a first end side and a first end side boss portion extending outward from the recess along an axial direction of the final gear, wherein the first end side boss portion is rotatably supported by the axle housing, wherein in a first cylindrical portion extending in a same direction for the axial direction of the first side gear is formed on an inner peripheral side for the first end side boss portion on the first side gear, wherein the axle housing has a first end portion facing the first end side of the first side gear in the axial direction, wherein in the first end portion of the axle housing, a first insertion hole for extending the first cylindrical portion to outer of the axle housing is formed, and wherein the first cylindrical portion is relatively rotatably supported on an inner circumference side of the first end side boss portion.

3. The transaxle according to claim 2, wherein in the axle housing, a first oil seal is disposed between an inner circumference surface of the first insertion hole and an outer circumference surface of the first cylindrical portion, and wherein the first end portion of the axle housing is recessed inward in the axial direction of the first side gear so that the first oil seal is disposed on an inner side of the first bearing in a radial direction.

4. The transaxle according to claim 2, wherein the final gear has a second end side boss portion extending outward from the second end side along the axial direction, wherein the second end side boss portion is rotatably supported by the axle housing, wherein in a second cylindrical portion extending in the a same direction for the axial direction of the second side gear is formed on an inner peripheral side for the second end side boss portion on the second side gear, and wherein the second cylindrical portion is relatively rotatably supported on an inner circumference side of the second end side boss portion.

5. The transaxle according to claim 2 further comprising: a differential lock slider that is slidable on the second cylindrical portion of the second side gear in the axial direction, and wherein the differential lock slider is disposed on an inner side of the second end side boss portion in the radial direction, and has a distal end that is able to protrude toward an inner side of a casing through the final gear and being held so as not to rotate relative to the final gear at all times, and can be selectively engaged or disengaged to the second side gear.

6. The transaxle according to claim 2, wherein the final gear has a second end side boss portion at an outer peripheral portion on a second end side of the final gear, wherein the second end side boss portion is rotatably supported by the axle housing, wherein a second cylindrical portion extending in a same direction for the axial direction of the second side gear is formed on an inner peripheral side of the second end side boss portion on the second side gear, wherein the axle housing has a second end portion facing the second end side of the second side gear in the axial direction, wherein in the second end portion of the axle housing, a second insertion hole for extending the second cylindrical portion to outer of the axle housing is formed, and wherein the second cylindrical portion is relatively rotatably supported on an inner circumference side of the second end side boss portion.

7. The transaxle according to claim 4 further comprising: a differential lock slider that is slidable on the second cylindrical portion of the second side gear in the axial direction, and wherein the differential lock slider is disposed on an inner side of the second end side boss portion in the radial direction, and has a distal end that is able to protrude toward an inner side of a casing through the second side gear and being held so as not to rotate relative to the second side gear at all times, and can be selectively engaged or disengaged to the first side gear.

8. The transaxle according to claim 1, wherein the group of pinions include six sets of first and second pinions along an outer circumference end portion of the first and the second side gears, the first pinions meshing with a radial direction outer end portion of the first side gear, the second pinions meshing with a radial direction outer end portion of the second side gear and meshing with the first pinion.

9. A transaxle comprising:

an axle housing in which an input gear is rotatably supported;

a final gear that is contained in the axle housing while being rotatably supported relative to the axle housing, and having a cavity at an axis of the final gear;

first and second side gears as a pair of spur gears that are contained in the cavity of the final gear, coaxially arranged, butted portions of the first and second side gears are relatively rotatable with each other, and rotatable relative to the cavity;

a group of pinions as spur gears that are rotatably supported in the cavity of the final gear by rotational shafts that are in parallel with axes of the first and the second side gears in the cavity, the group of pinions transmitting power between the first side gear and the second side gear, wherein the rotational shafts are supported in the cavity such that the rotational shafts do not get out of the cavity.

10. The transaxle according to claim 9, wherein the final gear is configured as a single unit that cannot be separated to a part of first end side and a part of second end side in an axial direction of the final gear.

* * * * *